Figure 5:
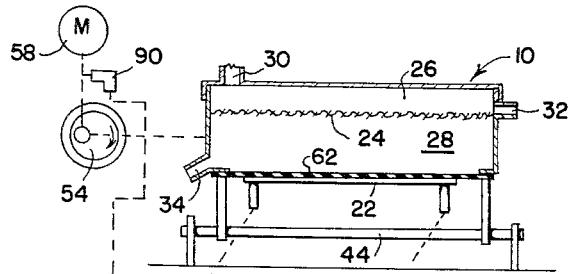

Feb. 22, 1966   W. A. BRASTAD ETAL   3,236,380
MATERIAL CLASSIFYING APPARATUS
Filed March 29, 1963   2 Sheets-Sheet 1
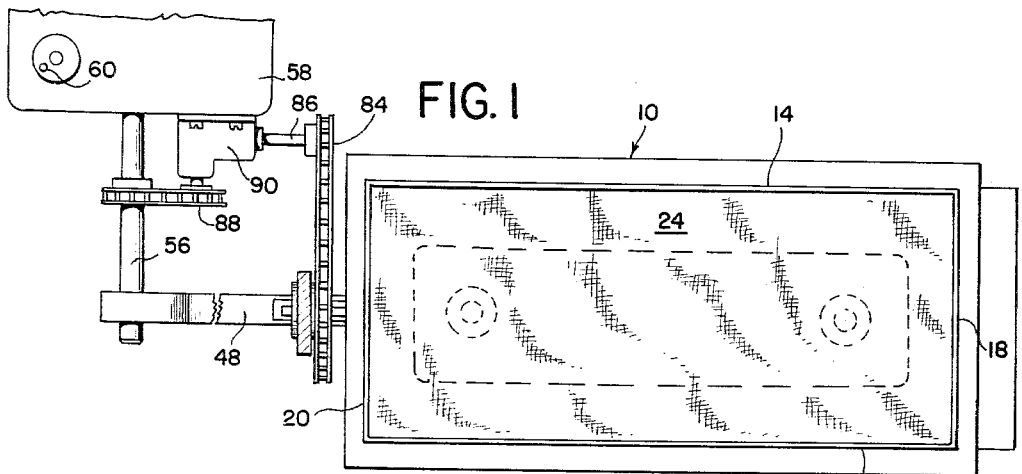
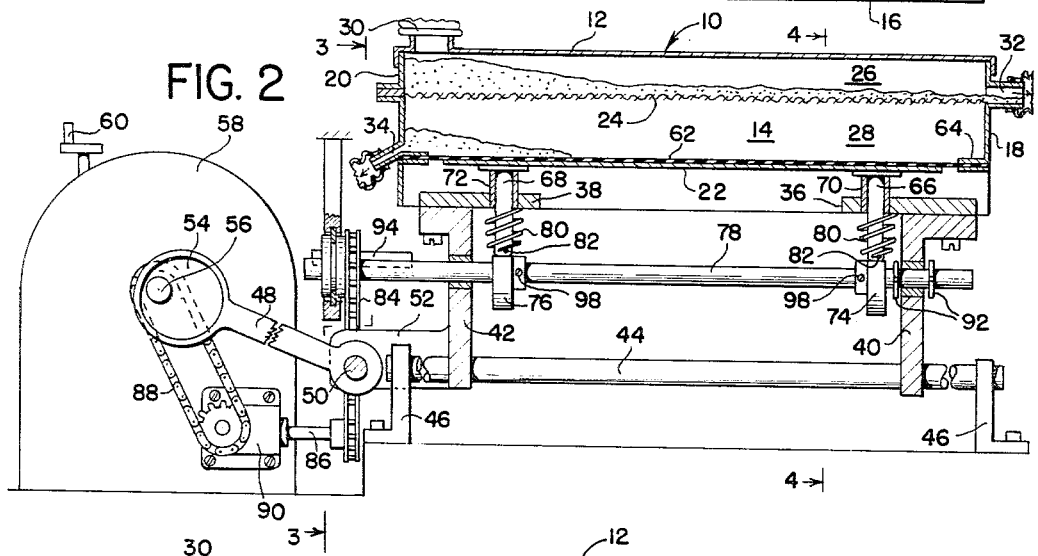
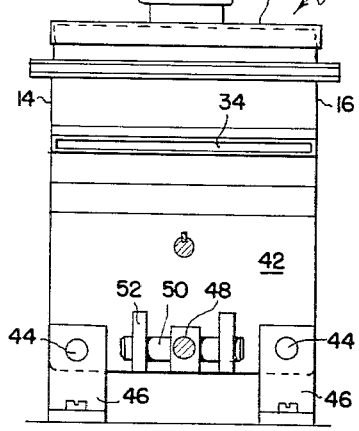
INVENTORS
WILLIAM A. BRASTAD
STANLEY C. RUSTAD
BY *Robert B. Hughes*
ATTORNEY Feb. 22, 1966   W. A. BRASTAD ETAL   3,236,380

MATERIAL CLASSIFYING APPARATUS

Filed March 29, 1963   2 Sheets-Sheet 2

INVENTORS
WILLIAM A. BRASTAD
STANLEY C. RUSTAD
BY *Robert B. Hughes*

ATTORNEY

United States Patent Office 3,236,380
Patented Feb. 22, 1966

3,236,380
MATERIAL CLASSIFYING APPARATUS
William A. Brastad and Stanley C. Rustad, Minneapolis, Minn., assignors to General Mills, Inc., a corporation of Delaware
Filed Mar. 29, 1963, Ser. No. 269,077
3 Claims. (Cl. 209—321)

The present invention relates generally to apparatus for use in the processing of finely ground or powdered materials such as flour milling stocks to effect the proper movement of such materials, and more particularly to such apparatus as embodied in vibratory or reciprocating sifters.

In commercial flour milling, sifting units are known in which stock is conveyed across a screen or sifting surface as the stock is being classified by the screen into separate fractions of different particle size. The sifting surface is often enclosed in an outer box or frame to prevent escape of fine particles of stock. To attain the proper conveying and sifting action, there is imparted to the sifting surface a rapid reciprocating or vibratory movement, the path of which has both a horizontal and a moderate vertical component. This is accomplished usually by suspending the sifting unit from a set of swing mounted hanger members and locating the sifting unit a short distance forward of its position of suspended equilibrium so that the hangers are slanted moderately from the vertical. Then the unit is oscillated along a relatively short path of arcuate travel parallel generally to the direction in which the hangers are slanted. In each cycle of reciprocation, the sifting unit with its sifting surface moves forwardly and moderately upward and then rearwardly and moderately downward to impart a net increment of forward travel to the stock on the sifting surface. Thus as the stock is being classified by the reciprocating sifting surface, the stock retained on the sifting surface is being conveyed at a moderate rate to the discharge end thereof, as is the stock which passes through the screen to the floor of the sifting unit.

To provide for control of the movement of stock across the screen, the apparatus is sometimes arranged so that adjustments can be made in the hanger angle to impart a greater or less vertical component to the path of reciprocation, and also so that adjustments can be made in the frequency and amplitude of the reciprocating movement of the sifting unit. Yet there are problems and limitations with respect to the control that can be achieved in this prior art apparatus. One such problem has been that of the adverse effect of variations in the instantaneous periodic air pressures above and below the sifting surface, which pressures are caused by the reciprocating action of the sifting unit. Further, there is the consideration that the direction of conveying is largely determined by the direction in which the sifting surface is traveling horizontally as it is moving upwardly, this, of course, being governed by the direction in which the hangers are slanted. Since a single sifting unit is largely a unitary structure and thus oscillates as one, there is consequently a limitation as to the direction in which conveying can be accomplished.

Thus it is an object of the present invention to provide an improved apparatus especially adapted for use in a sifting unit generally of the type described, in which a desired conveying action of stock is attained by properly generating desired periodic pressures proximate a foraminous surface, such as a sifting surface, in timed sequence with a cyclic movement of such surface, so that the conveying can be achieved without the necessity of adding a vertical component to such cyclic movement, and so that stock can be conveyed in substantially any direction in which the surface is traveling in its cyclic movement.

It is also an object to provide such an improved apparatus in which the rate of conveying as well as the direction thereof can easily be changed with a relatively high degree of control, while alleviating any adverse pressure effects which might otherwise be generated by the cyclic movement of such apparatus.

These and other objects and features of the invention will be more readily understood and appreciated from the following detailed description of the preferred embodiments thereof selected for purposes of illustration and shown in the accompanying drawings, in which:

FIGURE 1 is a top plane view of a sifting unit embodying preferred teachings of the present invention, with the cover of the sifting unit removed, FIGURE 2 is a side elevational view thereof, FIGURE 3 is a rear elevational view taken on line 3—3 of FIGURE 2, FIGURE 4 is a transverse sectional view taken on line 4—4 of FIGURE 2, and FIGURES 5 through 8 are a series of schematic drawings showing the apparatus of my invention in four functioning positions to better illustrate its mode of operation.

As shown in the accompanying drawings, there is a body portion 10 of the sifting unit, having a generally rectangular box-like configuration, and comprising a top cover 12, two sidewalls 14 and 16, front and rear end walls 18 and 20, and a movable bottom wall or floor 22, the function of which will be disclosed more fully hereinafter. A sifting screen or surface 24 extends horizontally across the interior of the box 10 and thus effectively divides the box into an upper retaining chamber and a lower collecting chamber, designated 26 and 28, respectively. At the rear of the box 10, there is provided in the cover 12 a suitable inlet 30 through which flour stock to be sifted is fed onto the rear end of the sifting screen 24. At the front end of the box 10 there is provided for the upper chamber 26 an outlet 32, through which flour stock retained on the screen 24 is discharged. A discharge opening 34 for the lower chamber 28 is provided (for reasons to be disclosed hereinafter) at the rear end of the box 10. So that the lower chamber 28 remains substantially closed, the cross sectional area of the opening 34 is made relatively small.

To support the box 10, there are fixedly secured to downward extensions of the sidewalls 14 and 16 a pair of longitudinally spaced transverse mounting bars 36 and 38, each of which is in turn fixed to a respective one of two downwardly extending mounting brackets 40 and 42. So that the box 10 may be reciprocated longitudinally, the brackets 40 and 42 are mounted for longitudinal slide motion on a pair of guideways 44, which are in turn fixed to the building structure by suitable footings indicated at 46.

A reciprocating sifting motion is imparted to a body 10 by a driving rod 48, one end of which is pivotally connected at 50 to a bracket 52 fixed to the aforementioned rear mounting bracket 42, and the other end of which is driven by an eccentric 54 mounted on a drive shaft 56. The drive shaft 56 is in turn driven by any suitable power source, such as motor 58, provided with a manually operable speed adjustment handle 60. Thus the sifter can be reciprocated longitudinally at a desired frequency and at a desired amplitude, the latter being accomplished by adjusting the "throw" of the eccentric 54.

The aforementioned movable bottom wall or floor 22 is planar and generally rectangular and is covered by a flexible membrane 62 which is joined to a suitable rectangular border frame 64 which reaches along the lower portions of the side and end walls 14, 16, 18, and 20. Thus it can readily be seen that the wall 22 extends beneath substantially the entire area of the screen 24 across which the stock is to be conveyed. Fixed to and depending from the bottom wall 22 are a front and rear supporting post 66 and 68, each of which is mounted for vertical slide motion in a respective one of two journals 70 and 72, formed, respectively, in the front and rear mounting bars 36 and 38. To impart a suitable vertical reciprocating motion to the bottom wall 22, each of the posts 66 and 68 rests by its lower end on a respective one of two cams 74 and 76 mounted on a cam shaft 78. Each of the posts 66 and 68 is urged downwardly from its mounting bar 36 or 38 against its related cam 74 or 76 by a related compression spring 80 sleeved onto its post 66 or 68 and bearing downwardly against a pin 82 at the lower end of its post 66 or 68.

To rotate the cam shaft 78 in proper phase relation with respect to the eccentric 54, there is a suitable chain and sprocket drive 84 connecting the cam shaft 78 to an intermediate drive shaft 86. This shaft 86 is in turn driven from the aforementioned main shaft 56 through a second chain and sprocket drive 88 and a suitable transmission, shown schematically at 90. The cam shaft 78 is arranged to move longitudinally with the sifting box 10 and is thus provided with a pair of stop collars 92 fixed one on each side of the front mounting bracket 40, while the rear end of the cam shaft 78 has a spline connection 94 with the drive gear 96 of the chain and sprocket drive 84. Thus it can be seen that as the box 10 reciprocates longitudinally, the bottom wall 22 likewise reciprocates along a path having a longitudinal component of travel equal to that of the box 10 and having a vertical component of travel in timed phase relationship therewith.

The preferred mode of operation of the present embodiment is illustrated schematically in FIGS. 5 through 8, in which the drive 84–90 from the drive shaft 56 to the cam shaft 78 is such that the rotational speed of the cam shaft 78 is the same as that of the eccentric 54. However, it is to be understood that by modifying or adjusting the drive 84–90 the bottom wall 22 may be reciprocated at frequencies other than that at which the box 10 is reciprocated to achieve particular conveying effects. It will further be noted that the cams 74 and 76 are fixed to the cam shaft 78 by an adjustable connection (as by the set screw shown at 98) so that the phase relationship of the reciprocating movement of the bottom wall 22 may be adjusted with respect to the movement of the box 10. Also the amplitude of the vertical component of reciprocation of the bottom wall 22 can be changed by replacing the cams 74 and 76.

Figure 6:
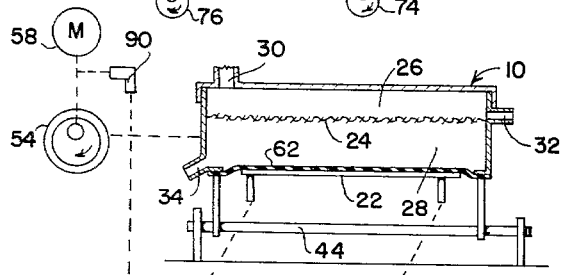
Figure 7:
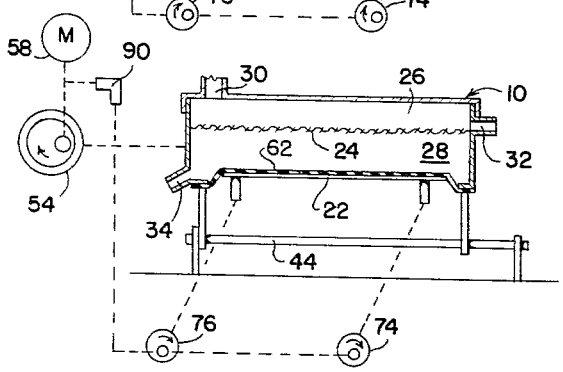

The mode of operation is schematically illustrated in FIGS. 5 through 8, wherein the successive operating positions of the sifting unit 10 and the bottom wall 22 are indicated by showing the corresponding positions of their respective drive components, the eccentric 54 and the cams 74 and 76. As flour stock is fed into the upper chamber 26 through the inlet 30, the eccentric 54 reciprocates the box 10 (along with the bottom wall 22) longitudinally, while the cams 74 and 76 reciprocate the bottom wall 22, vertically. As shown in FIG. 5, when the eccentric 54 has moved the box 10 to its furthest forward position, the cams 74 and 76 have brought the bottom wall 22 to its lowest position. (As shown herein, when the bottom wall 22 is at its lowest position, it is co-planar with the surrounding border frame 64. However, in actual practice, it may be desirable to arrange the apparatus so that the bottom wall 22, in a cycle of vertical motion travels an equal distance above and below the surrounding frame 64). As the eccentric 54 moves the box 10 rearwardly (as shown in FIG. 6), the cams 74 and 76 are moving the bottom wall 22 upwardly, until the box 10 has reached its rear limit of travel (as shown in FIG. 7), at which time the cams 74 and 76 have moved the bottom wall 22 to its upper limit of travel.

Figure 8:
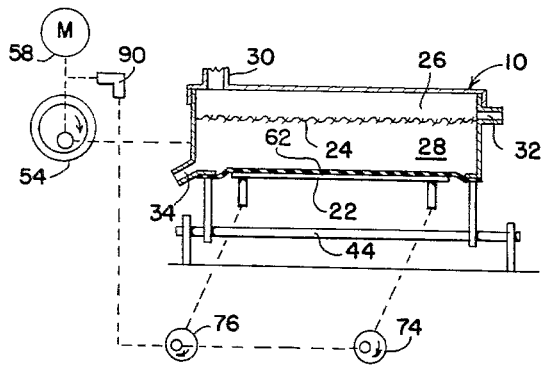

During this upward movement of the bottom wall 22, air in the lower chamber 28 is pushed upwardly toward the sifting screen 24, causing an instantaneous increase in pressure below the screen 24 and tending to lift the stock off the screen 24. Conversely, when the bottom wall 22 has reached its upper limit of travel (as in FIG. 7) and then descends (as shown in FIG. 8), the wall 22 tends to pull air from the upper chamber 26 down through the screen 24 into the lower chamber 28, creating a decrease in pressure below the screen 24 and tending to press the flour stock down against the screen 24.

Thus, as the eccentric 54 is moving the box 10 forwardly (as in FIG. 8), the flour stock on the screen 24 is being pressed (because of the downward movement of bottom wall 22) against the screen 24 to be held fast thereto or at least to have a greater frictional force exerted between the floor stock and the sifting screen 24. On the other hand, when the box 10 is moving rearwardly and the bottom wall 22 is moving upwardly (as in FIG. 6), the flour stock on the screen 24 tends to be lifted therefrom, thus decreasing the frictional force between this flour stock and the screen 24. Thus the screen 24 imparts a periodic forward force to the flour stock thereon that is stronger than an alternating periodic rearward force of equal duration, with the result that the flour stock on the screen 24 is conveyed at a moderate rate forwardly along the screen to the discharge outlet 32.

An opposite effect takes place with respect to the flour which passes through the screen 24 and falls on the bottom wall 22. As the box 10 moves rearwardly from the position of FIG. 5 to the position of FIG. 7, the bottom wall 22 moves upwardly against the flour material resting thereon, and as the box 10 is moving forward, the bottom wall 22 is dropping away from this flour stock. The net effect is to move the flour stock on the bottom wall 22 rearwardly to be discharged out the lower chamber outlet 34.

In practice, it has been found that flour stock is conveyed most rapidly across the screen 24 by advancing the phase angle of the cams 74 and 76 by a sixteenth of an eighth of a revolution (i.e. 22½° to 45°). It can be theorized that the cause for this is that there is a time lag in the movement of bottom wall 22 causing a corresponding pressure variation proximate the screen 24. It has also been found that by making small variations in the phase relationship between the eccentric drive 54 and the cam drive 74–76, that the speed with which flour is conveyed along screen 24 can be controlled within fairly accurate limits for substantially the entire area of the screen 24. Also by changing the phase of the cams 74 and 76 by 180°, the direction of conveying may be reversed, with no need of any change in the sifting motion of the box 10.

From the foregoing description, it is apparent that by properly timing the vertical reciprocating motion of the bottom wall 22, movement of the stock on the sifting screen can be created along any direction in which the sifting screen has a substantial component of horizontal motion during its cyclic sifting movement. Thus in one sifting unit, by providing a pair of bottom walls moving out of phase with each other, and properly isolating (as by partitions) the pressure effects of each, conveying may be achieved in opposite directions simultaneously over different portions of the same screen. Also if a cyclic horizontal sifting movement is imparted to the sifting surface other than a reciprocating movement along one line, by properly moving several suitable lower chamber wall members in proper phased relationship with different specific portions of the horizontal cyclic movement and also isolating the pressure effects of each (e.g. by partitions), conveying on the screen along a more circuitous path can be achieved. Since the cyclic movement of the sifting unit will often create undesirable pressure effects which may detract from the proper conveying movement of the stock, it may be desirable to utilize a plurality of movable wall members of the type shown herein and to impart to them movements having different amplitudes and/or phases.

Now therefore we claim:

1. An apparatus for classifying relatively fine particles of material, which device comprises a body having a longitudinal axis and providing confining means defining an enclosure in which the material to be classified is contained in the presence of a gaseous medium, a sifting surface partitioning said enclosure into an upper retaining chamber and a lower collecting chamber, driving means to impart to said sifting surface a cyclic sifting motion along a path of travel, a substantial portion of the total components of which is in a horizontal direction, which sifting motion causes material that is situated in said retaining chamber to be classified in a manner that one class of said material passes through said sifting surface into said collecting chamber and another class of said material is prevented by said sifting surface from passing into said collecting chamber, material inlet means at one end of said upper chamber and material outlet means at the other end of said upper chamber, said body having a generally horizontal bottom wall which defines said lower collecting chamber and is movable vertically with respect to said body, pressure generating means to move said bottom wall in a cyclic up and down motion in timed relationship with said driving means to generate desired periodic pressure differentials proximate said sifting surface, whereby material on said sifting surface is alternately subjected to a lifting force and depressing force in proper timed relationship with said cyclic sifting motion, to cause the material to be conveyed along the sifting surface as the material is being classified, and other material outlet means leading from said lower collecting chamber, said other material outlet means being located at the same end of said apparatus as said material inlet means, whereby material which passes through said sifting surface and is conveyed in a direction opposite to that in which the material retained on said sifting surface is conveyed is able to pass out said outlet means, said upper and lower chambers being substantially closed except for the material inlet and outlet means recited herein.

2. The apparatus as recited in claim 1, wherein said pressure generating means is such that the phase relationship thereof with respect to said driving means is adjustable, whereby the velocity of said conveying can be controlled.

3. The apparatus as recited in claim 1, wherein the phase relationship of said pressure generating means with respect to said driving means is such that the cyclic movement of said pressure generating means lags that of said driving means, whereby the conveying velocity of said classifying surface is maximized.

References Cited by the Examiner

UNITED STATES PATENTS

| 383,262 | 5/1928 | Weiss | 209—321 |
| 1,848,473 | 3/1932 | Gorbutt | 209—269 |
| 2,928,545 | 3/1960 | Forsberg | 209—467 |

FOREIGN PATENTS

| 13,957 | 10/1887 | Great Britain. |
| 72,275 | 3/1917 | Switzerland. |

HARRY B. THORNTON, *Primary Examiner.*

HERBERT L. MARTIN, *Examiner.*